(12) United States Patent
Risser

(10) Patent No.: US 10,079,400 B2
(45) Date of Patent: Sep. 18, 2018

(54) ELECTROCHEMICAL POWER GENERATION DEVICE WITH RE-GENERABLE FUEL SYSTEM

(71) Applicant: Scott Risser, Tempe, AZ (US)

(72) Inventor: Scott Risser, Tempe, AZ (US)

(*) Notice: Subject to any disclaimer, the term of this patent is extended or adjusted under 35 U.S.C. 154(b) by 0 days.

(21) Appl. No.: 15/248,856

(22) Filed: Aug. 26, 2016

(65) Prior Publication Data

US 2017/0062859 A1    Mar. 2, 2017

Related U.S. Application Data

(60) Provisional application No. 62/210,285, filed on Aug. 26, 2015.

(51) Int. Cl.
| | |
|---|---|
| *H01M 8/16* | (2006.01) |
| *H01M 8/0606* | (2016.01) |
| *H01M 8/18* | (2006.01) |

(52) U.S. Cl.
CPC .......... *H01M 8/16* (2013.01); *H01M 8/0606* (2013.01); *H01M 8/18* (2013.01); *Y02E 60/527* (2013.01); *Y02E 60/528* (2013.01)

(58) Field of Classification Search
None
See application file for complete search history.

(56) References Cited

U.S. PATENT DOCUMENTS

| | | | | |
|---|---|---|---|---|
| 4,242,448 A | * | 12/1980 | Brown, III | ........... B01D 53/501 423/DIG. 17 |
| 8,715,504 B2 | * | 5/2014 | Rozendal | .............. C02F 1/4693 210/243 |
| 2011/0020862 A1 | * | 1/2011 | Audebert | ............... C12M 21/04 435/41 |
| 2013/0299400 A1 | * | 11/2013 | Silver | ................. C02F 1/46109 210/150 |
| 2013/0344400 A1 | * | 12/2013 | Girguis | ............... H01M 8/1018 429/401 |
| 2016/0111742 A1 | * | 4/2016 | Han | ........................ H01M 8/06 429/416 |

* cited by examiner

*Primary Examiner* — Lucas J. O'Donnell
(74) *Attorney, Agent, or Firm* — Gavin J. Milczarek-Desai; Quarles & Brady LLP

(57) ABSTRACT

Apparatus and methods to generate electricity from air and municipal sewage, manure, food waste and/or potentially other organic waste sources using sulfate reducing bacteria, SRB. The SRB produce hydrogen sulfide in an apparatus named a biominer. The odorous gas is then scrubbed into an aqueous solution. The solution is sent to an electrolytic continuous flow cell power generator on the anode side where the sulfur is oxidized to sulfate and is recycled to the biominer process. The generator cathode side uses a standard oxygen cell chemistry.

2 Claims, 3 Drawing Sheets

__US 10,079,400 B2__

ELECTROCHEMICAL POWER GENERATION DEVICE WITH RE-GENERABLE FUEL SYSTEM

CROSS REFERENCE

This application claims priority to U.S. provisional patent application 62/210,285 filed on Aug. 26, 2015, which is incorporated by reference herein in its entirety.

BACKGROUND

Field of the Invention

This disclosure relates to the generation of power through a multi-step process: 1) biological conversion and removal of sulfur from fecal matter as well as other biologically digestible materials containing sulfur and carbon, i.e., biomining, and 2) oxidizing the reduced sulfur in an oxygen/sulfur electrolytic flow cell arrangement. The spent sulfur is recirculated back into the biominer for recycling.

Description of the Related Art

The generation of power electrochemically is most commonly related to a fuel cell device where gaseous hydrogen and oxygen are fed into an electrolytic cell device. Sometimes hydrocarbons are feed to the system and are reformed into hydrogen for use in the generation device. Hydrogen is an expensive fuel source because it is typically used for manufacturing of higher value chemicals and not on low value fuel. A fuel cell uses catalysts to help the oxidation and reduction reactions. These cells have an efficiency limit because of internal resistance of the materials and geometries used. Fuel cells are found in low and high temperature designs. Each style has benefits and drawbacks.

Some sulfur based power generation technology (USPTO 2011/0226631A1) discussed using elemental sulfur electrodes in an electrolytic cell to generate power. The attempt was to consume sulfur currently being disposed of from other industrial processes in a process to generate supplemental power. The system uses organic electrolyte and the anode is consumable. Another method was found to generate power from sulfur dissolving in a solvent in a reaction cell used for high precision detection equipment (U.S. Pat. No. 4,169,779). This method was for analytical use only and would definitely not be feasible for power generation at any scale. Finally, two other processes were found in professional journals that simply tried to oxidize sulfide only to elemental sulfur for removal from solution as a particulate. While this process is of no direct interest, their abstract describes the lengths that most sewage treatment systems will go to abate sulfide formation indicating that given the correct food sources this production is spontaneous. (J Environ Manage Feb. 1, 2015; 149:263-70. Doi: 10.1016/j.jenvman 2014.10.024 Epub Nov. 15, 2014 ) (Water Res 2008 December: 42(20):4965-75. Doi:10.106/j.watres.2008.09.007 Epub Sep. 27, 2008 )

Other forms of electrolytic devices for power production normally are found in storage and rechargeable batteries. In these various technologies are found many parings of oxidation and reduction reactants, electrolytes and electrode configurations. Many of the current designs use lithium, a low weight to power ratio material as a reactant.

One other attempt at generating power using bacterial conversion of waste organics grew bacteria directly on electrodes and does demonstrate power generation. This technology appears to only be viable in lab environments due to at least one issue; the bacteria is in an environment where it can grow unchecked and would clog the operating components.

SUMMARY

The objective of this invention is a carbon neutral/negative base load power generation method that can be scaled to commercial sized systems for semi distributed power generations worldwide.

The embodiment of this invention is shown for conceptual understanding and small scale detail not indicative of the final, full sized system and is for conceptual purpose only.

The embodiments are diagramed below and each flow line is numbered for reference in subsequent discussion below.

DETAILED DESCRIPTION

This disclosure relates to the generation of power through biomining of biological waste matter in an oxygen/sulfur electrolytic flow cell arrangement. The spent sulfur is recirculated back into the biominer for recycling.

Embodiments herein utilize two key technology areas, combining them in a unique fashion. Wastewater treatment and electrochemical power are the two key fields upon which these embodiments are based, though key differences exist within the present treatment of these technological fields from common practice.

Figure 1:
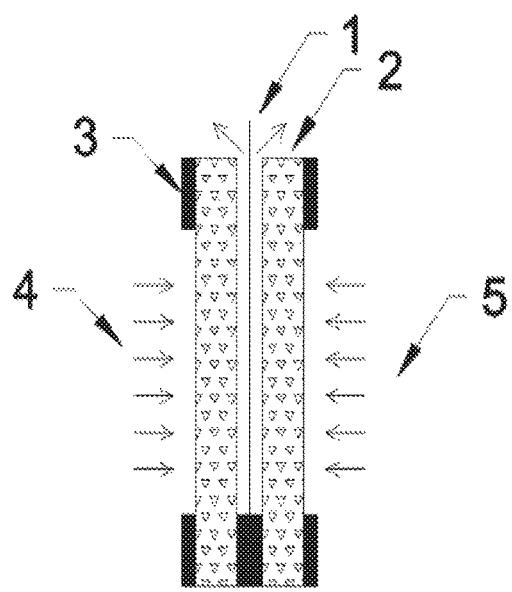
FIG. 1 illustrates the primary component of an embodiment, i.e., an electrolytic continuous flow cell using expanded surface area/porous materials for electrodes.

An embodiment of the generation portion of this system is found in FIG. 1, where construction generally includes a separation membrane 1 that is of a construction that is chemically resistant and configured to provide a salt bridge between the anodic and cathodic solution 4, 5. The solutions are pumped into the back side of the expanded, porous surface area and conductive pair of electrodes 2 and flows through it toward the membrane 1. The electrodes will most commonly be porous sintered metal or graphite, but can include any conductive material. The solution flows through a small gap along the membrane and out of the cell where it is collected. The electrodes and membranes use gaskets 3 for sealing of the liquid and gases as appropriate. The gaskets also form channels and flow paths for the configuration described. Other embodiments have been demonstrated, this is one possibility. The solution for the anode contains reduced sulfur in an elevated pH solution. The solution for the cathode is either a humidified air stream or a water/organic/air solution.

Figure 2:
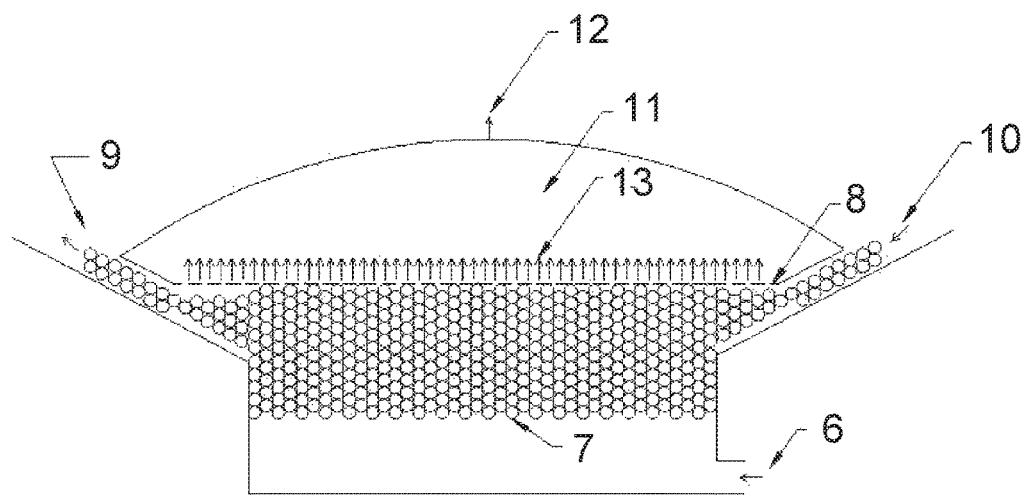
FIG. 2 illustrates other main components used in conjunction with the embodiment in FIG. 1. Shown in detail is the biomining system that converts oxidized sulfur compounds to reduced sulfide gas or hydrogen sulfide. The biomining process uses sulfate reducing bacteria to selectively consume organic waste material and produce the hydrogen sulfide gas. The organic material can be manure, human waste or other digestible organics such as food.

The second system component is the biominer shown in FIG. 2. The inlet of reactants 6 to the biominer brings organics and oxidized sulfur compounds for the sulfate reducing bacteria (SRB) to consume and convert. The bacteria is cultured on media with expanded surface are in a low density granular form 7. The influent rises through the media and exits a perforated screen 8 at the top of the bed 13. Granular media is regularly added 10 and removed 9 from the bed to clean the media of excess bacteria and other substances that may plug the media bed. The effluent flows off the top of the perforated plate and evolved gas, hydrogen sulfide, is accumulated in the space above 11 and exit a port 12 where further processing will take place.

Figure 3:
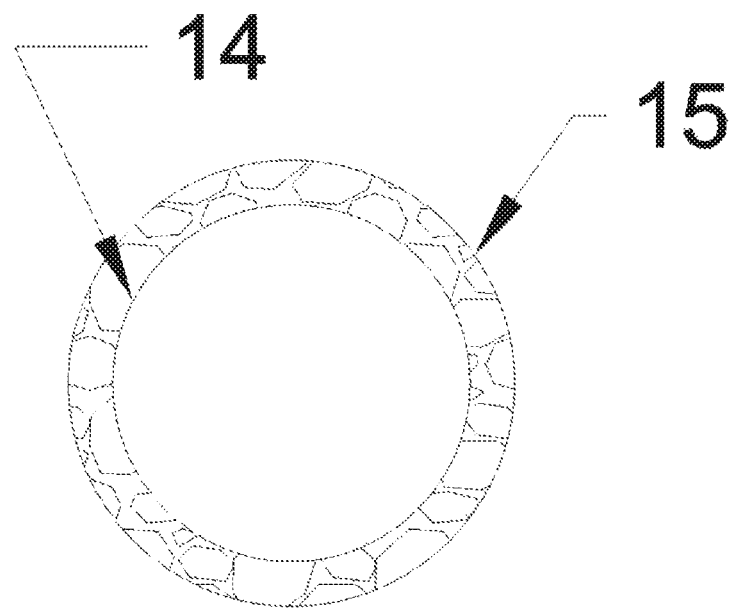
FIG. 3 illustrates a single sphere used in the embodiment of FIG. 2 for the bacteria to grow on and still allow for good mass transport of both organic food material and oxidized sulfur.

Diagrammatically, FIG. 3 shows the bacteria growth media can be visualized as a sphere 14 where a polymeric material is used. A biogrowth 15 occurs on the surface. The biogrowth continues to grow with food added but nutrients do not reach the lower levels near the media which begins dying or converting to other undesired bacteria. This "husbandry" of removing media, cleaning through agitation and returning it to the biominer maintains a healthy colony of desired bacteria, for example, SRB.

Figure 4:
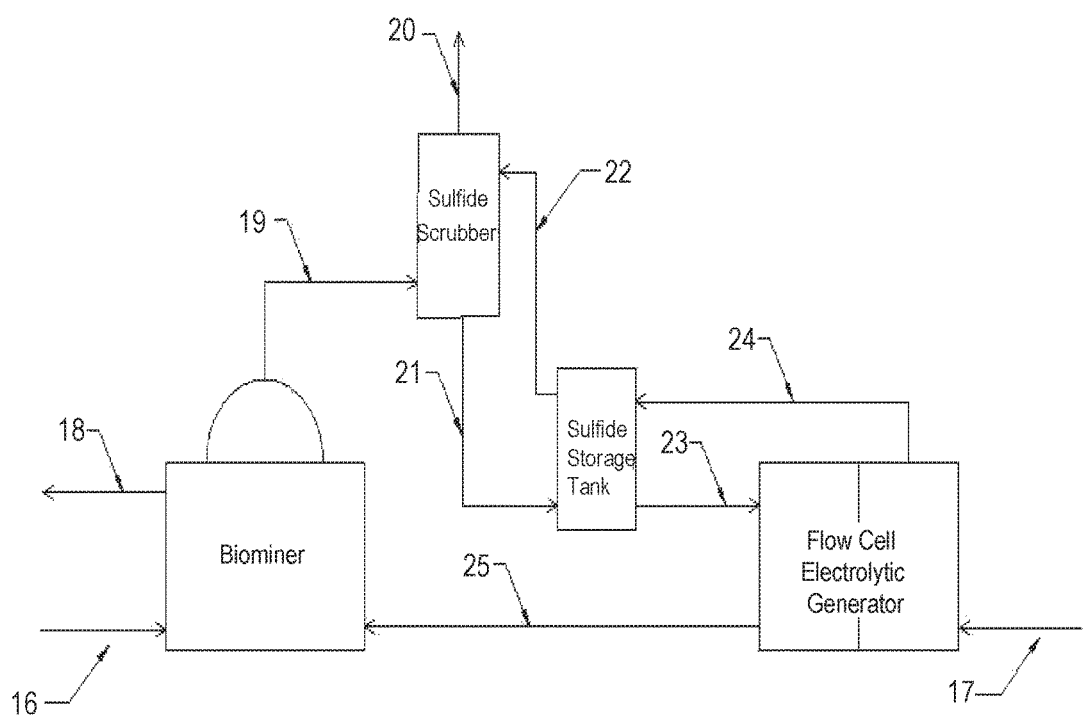
FIG. 4 shows a diagram of an integrated system embodiment. The integrated system has a hydrogen sulfide scrubber to prepare the sulfide solution for the power generation system as well as surge tanks as needed.

Finally, an overall flow path view shows the biominer and electrolytic generator along with a sulfide scrubber and storage tank for sulfide solution, FIG. 4. The biominer is fed from two sources, sewage or equivalent 16 and spent sulfur fuel 25. The spent sulfur is recycled and the bacteria reduce it back to fuel using the carbon source to balance the electrons in the reaction. Spent effluent is removed 18 and is sent for continued sewage/wastewater treatment. The generated hydrogen sulfide 19 is sent to a scrubber where any inert gases are vented 20. A source of caustic is beneficial for scrubber performance. Caustic is the byproduct 24 of the oxygen cell reaction in the generator and can be used for this purpose. If additional caustic is necessary, other industrial sources of caustic can be obtained and used. The lean caustic solution 22 is pumped to make contact with the hydrogen sulfide gases. The rich solution 21 then comes either back to the scrubber supply tank or a separate tank to feed the generator (flow 23). The higher the concentration of sulfur in the rich solution, the higher the voltage from the sulfur half-cell reaction as directed from the Nernst equation. The generator cathode is fed oxygen in dissolved liquid form, a foam liquid form or a humidified gaseous form 17.

Because municipal waste is already oxidized in waste water treatment processes the organics are oxidized to carbonate or carbon dioxide. Therefore, this technique does not result in an increase of carbon footprint. Substituting this generation method for natural gas and coal combustion results in a large scale will decrease carbon emissions globally. Recirculating a sulfurous solution through the biomining process allows 0.6 lbs of sulfide per hour to generate one KWhr of electricity or 600 lbs of sulfide per MWhr. This would require 450 lbs of BOD carbon to regenerate the sulfate back to sulfide in the biomining process. This is assuming 100% chemical efficiency. Different cell geometries and membranes can impact efficiency.

The claims hereinafter are not meant to be limited to the materials and methods described above.

The invention claimed is:

1. A cyclic method to generate electrical power from a sulfur-containing organic waste source utilizing a bioreactor containing sulfate reducing bacteria (SRB), a scrubber with inlet and outlet in fluid connection with a storage tank, and an electrolytic cell comprised of an anodic chamber, a cathodic chamber, and an ion-permeable membrane separating these chambers, comprising the steps of:
  (1) flowing an aqueous mixture of sulfate, sulfur, and organic matter into a biomining chamber as metabolic feedstock for microorganisms, including SRB, present in said biomining chamber, whereby the mixture is processed and thereby converted from sulfate and other sulfur compounds to hydrogen sulfide;
  (2) a means for retaining said microorganisms including SRB in said biomining chamber, thereby preventing passage of said microorganisms downstream of said biomining chamber whereas said hydrogen sulfide produced by the microorganisms in the biomining chamber is evolved as a gas and is captured in the scrubber to form an elevated pH solution;
  (3) flowing said hydrogen sulfide in an aqueous solution of elevated pH to an electrolytic continuous flow cell power generator on the anodic chamber side, wherein the hydrogen sulfide aqueous solution is oxidized to sulfate and dissolved oxygen on the cathodic chamber side is reduced to water thereby generating electricity; and
  (4) recycling the sulfate of step 3 by combining said sulfate with new organic material in an aqueous mixture and flowing it back to the biomining chamber.

2. An electrolytic system for generating electricity from oxidation of a sulfur compound, comprising:
  a biomining chamber containing sulfur reducing bacteria (SRB), containing an aqueous mixture of sulfate, sulfur, and organic matter that may be continuously or intermittently supplied, water, organic sludge, and hydrogen sulfide;
  a gas scrubber in fluid connection with said biomining chamber and which provides hydrogen sulfide extraction from the biomining chamber such that undigested organics and microorganisms are retained in the biomining chamber and away from downstream processes;
  a sulfide solution storage tank in fluid connection with said gas scrubber such that said sulfide solution storage tank supplies fluid to and receives effluent from said scrubber; and
  an electrolytic flow cell in fluid connection with said sulfide solution storage tank and said biomining chamber, wherein the electrolytic fuel cell includes an anodic chamber and a cathodic chamber separated by an ion-permeable membrane, and the anodic chamber receives an elevated pH solution from said sulfide solution storage tank and discharges into the biominer.

* * * * *